(12) United States Patent
Miyoshi

(10) Patent No.: US 11,402,320 B2
(45) Date of Patent: Aug. 2, 2022

(54) PHASE DIFFERENCE CONTROL DEVICE

(71) Applicant: JASCO Corporation, Tokyo (JP)

(72) Inventor: Yuichi Miyoshi, Tokyo (JP)

(73) Assignee: JASCO Corporation, Tokyo (JP)

(*) Notice: Subject to any disclaimer, the term of this patent is extended or adjusted under 35 U.S.C. 154(b) by 71 days.

(21) Appl. No.: 16/975,568

(22) PCT Filed: Jan. 30, 2019

(86) PCT No.: PCT/JP2019/003236
§ 371 (c)(1),
(2) Date: Aug. 28, 2020

(87) PCT Pub. No.: WO2019/163457
PCT Pub. Date: Aug. 29, 2019

(65) Prior Publication Data
US 2020/0400554 A1 Dec. 24, 2020

(30) Foreign Application Priority Data
Feb. 26, 2018 (JP) .............................. JP2018-031529

(51) Int. Cl.
*G01N 21/19* (2006.01)
*G01J 3/02* (2006.01)
(Continued)

(52) U.S. Cl.
CPC ............ *G01N 21/19* (2013.01); *G01J 3/0224* (2013.01); *G01J 4/04* (2013.01); *G02B 27/283* (2013.01); *G05D 25/02* (2013.01)

(58) Field of Classification Search
CPC ...... G01N 21/19; G01N 21/211; G01N 21/21; G01J 3/0224; G01J 4/04; G01J 3/0286;
(Continued)

(56) References Cited

U.S. PATENT DOCUMENTS 4,850,710 A * 7/1989 Mochida ................ G01N 21/23
356/426
5,004,988 A 4/1991 Ueno et al.
(Continued)

FOREIGN PATENT DOCUMENTS

CN 1571918 A * 1/2005 ................ G01J 4/04
EP 0352695 B1 5/1994
(Continued)

OTHER PUBLICATIONS

Extended European Search Report (EESR) dated Oct. 26, 2021 for corresponding European Patent Application No. 19757225.8.
(Continued)

*Primary Examiner* — Mohamed K Amara
(74) *Attorney, Agent, or Firm* — Rankin, Hill & Clark LLP

(57) ABSTRACT

A phase difference control device comprises: a splitting polarizer splitting a light incident from a light source into a measurement light and a reference light, both of which are linearly polarized; a PEM imparting a phase difference to the measurement and reference lights to correspond to the spectrometry; a PEM driver supplying a modulation voltage to the PEM; a PEM control circuit inputting the reference light as a feedback signal and outputting a modulation control quantity signal to the PEM driver; and a CPU circuit monitoring the wavelength of the light in the splitting polarizer to input a wavelength variation as a wavelength signal, wherein the CPU circuit converts the wavelength signal to a feedforward signal which is output to the PEM control circuit; and the PEM control circuit performs arithmetic processing by the feedback and feedforward signals to output the modulation control quantity signal to the PEM driver.

4 Claims, 3 Drawing Sheets

(51) Int. Cl.
*G01J 4/04* (2006.01)
*G02B 27/28* (2006.01)
*G05D 25/02* (2006.01)

(58) Field of Classification Search
CPC ....... G01J 3/447; G02B 27/283; G02B 27/28; G05D 25/02; G05D 25/00; G02F 1/01
See application file for complete search history.

(56) References Cited

U.S. PATENT DOCUMENTS

| | | | |
|---|---|---|---|
| 5,298,973 A | | 3/1994 | Fukazawa et al. |
| 5,548,404 A | * | 8/1996 | Kupershmidt ....... G01N 21/211 356/368 |
| 5,956,147 A | * | 9/1999 | Jellison, Jr ............ G01N 21/211 356/369 |
| 8,451,446 B2 | * | 5/2013 | Garab ................... G01N 21/19 356/365 |
| 2003/0058442 A1 | * | 3/2003 | Garab ................... G01N 21/21 356/369 |
| 2006/0001876 A1 | * | 1/2006 | Gibbs ................... G01N 21/21 356/364 |
| 2008/0049224 A1 | | 2/2008 | Otsuki et al. |
| 2011/0043290 A1 | | 2/2011 | Hasegawa et al. |

FOREIGN PATENT DOCUMENTS

| | | | | | |
|---|---|---|---|---|---|
| FR | 2841648 | A1 | * | 1/2004 | ......... G03F 7/70566 |
| JP | 5-10821 | A | | 1/1993 | |
| JP | 2000502461 | A | * | 2/2000 | ................ G01J 4/04 |
| JP | 2004-184225 | A | | 7/2004 | |
| JP | 2007-139751 | A | | 6/2007 | |
| JP | 4799402 | B2 | * | 10/2011 | ........... G01N 21/956 |
| WO | 00/58699 | A1 | | 10/2000 | |
| WO | 2009/139102 | A1 | | 11/2009 | |
| WO | 2015/198061 | A1 | | 12/2015 | |

OTHER PUBLICATIONS

Dinitto et al., "Novel Technique for Improvement in Calibration of the Photoelastic Modulator in Circular and Linear Dichroism Spectroscopy", Applied Spectroscopy, vol. 67, No. 1, 2013, pp. 40-48; Cited in EESR.

Jellison et al., "Accurate calibration of a photo-elastic modulator in polarization modulation ellipsometry", SPIE, vol. 1166 Polarization Considerations for Optical Systems II, 1989, pp. 231-241; Cited in EESR.

International Search Report (ISR) dated May 7, 2019 filed in PCT/JP2019/003236.

* cited by examiner (a) Series-type TCXO (b) Indirect-type TCXO

PHASE DIFFERENCE CONTROL DEVICE

RELATED APPLICATIONS

This application claims the priority of Japanese Patent Application No. 2018-31529 filed on Feb. 26, 2018, the disclosure of which is incorporated herein by reference in its entirety.

FIELD OF THE INVENTION

The present invention relates to a technique for improving responsiveness of a phase difference control device used in various spectrometers comprising photoelastic modulators (PEM), particularly of a phase difference control device that can be employed in circular dichroism spectrometers (CD) and linear dichroism spectrometers (LD).

BACKGROUND OF THE INVENTION

Photoelastic modulators (PEM) have been conventionally used in various spectrometry. The PEM is generally known as an element that uses birefringence to modulate the phase of an incoming polarized light. Polarimetry that uses the PEM is extremely high-sensitive, and if a wavelength variation occurs in a light incident to the PEM, for example, a phase modulating action of the PEM is greatly affected. That is, a measurement result in spectrometry may be greatly affected by a wavelength variation or the like of a light incident to the PEM.

Thus, Patent Literature 1 discloses a phase difference modulator comprising a photoelastic modulator control circuit. By controlling to maintain the ratio of the amplitude of the AC component of the angular frequency of 2 ω to the magnitude of the DC component in the detected reference light at constant, the phase difference produced by a photoelastic modulator can be maintained constant regardless of the change in the wavelength of light incident to the photoelastic modulator and regardless of the change in the temperature of the photoelastic modulator itself.

CITATION LIST

Patent Literature

PATENT LITERATURE 1: Japanese Unexamined Patent Publication No. H5-10821 A.

DISCLOSURE OF THE INVENTION

Problem to be Solved by the Invention

Environmental changes (wavelength variations of an incoming light) of a photoelastic modulator can be handled by employing a configuration as in Patent Literature 1 to a phase difference control device; however, there is a limit in responsiveness of control with such configuration (since it is a control that captures a change occurred in a photoelastic modulator as a signal, it is always affected by the change), so that it could only be handled by step-scanning upon actually obtaining spectral data. That is, there was a problem that such technique could not be applied to spectrometers in which continuous-scanning is necessary, such as a circular dichroism spectrometer, for example.

Means to Solve the Problem

The present invention has been accomplished in view of the above-mentioned conventional art, and an object thereof is to provide a phase difference control device and method that can achieve a stable phase difference control even when a wavelength variation occurs in a light incident to a photoelastic modulator and can be handled by continuous-scanning by improving responsiveness of a phase difference control.

In order to solve the above-mentioned problem, a phase difference control device according to the present invention is a phase difference control device employed in a spectrometer that performs spectrometry to a sample, the phase difference control device comprising:

a splitting polarizer that splits a light incident from a light source into a measurement light and a reference light, both of which are linearly polarized; a PEM that performs a phase modulating action to impart a phase difference to the measurement light and the reference light to correspond to the spectrometry; a PEM driver that supplies a modulation voltage for making the PEM to perform the phase modulating action; and a PEM control circuit that inputs the reference light as a feedback signal and outputs a modulation control quantity signal to the PEM driver;

wherein the phase difference control device further comprises a CPU circuit that monitors a wavelength of the light in the splitting polarizer and inputs a wavelength variation thereof as a wavelength signal;

the CPU circuit converts the wavelength signal to a feedforward signal, and the feedforward signal is output to the PEM control circuit; and the PEM control circuit performs arithmetic processing by the feedback signal and the feedforward signal to output the modulation control quantity signal to the PEM driver.

Moreover, in the phase difference control device according to the present invention, the CPU circuit calculates the feedforward signal by an output command table that is prepared inside the CPU circuit in advance.

Moreover, the phase difference control device according to the present invention comprises:

a temperature compensating circuit for supplying the modulation voltage from the PEM driver to the PEM, the modulation voltage being a voltage to make the phase difference imparted to the measurement light and the reference light constant even if the temperature of the PEM changes, wherein the temperature compensating circuit inputs a detection value detected by a temperature detector for detecting the temperature of the PEM to perform a temperature compensating action.

Moreover, in the phase difference control device according to the present invention, the PEM driver is configured to comprise the temperature compensating circuit to at least a part thereof, and the temperature compensating circuit is configured to comprise a temperature compensating type crystal oscillator.

A phase difference control method according to the present invention is a method to control a phase difference of a PEM in a spectrometer that comprises at least a light source, a splitting polarizer, a PEM, a PEM driver, and a PEM control circuit, the method comprising:

a step of configuring a feedback control loop by: supplying a modulation voltage for performing a phase modulating action from the PEM driver to the PEM; splitting a light incident from the light source into a measurement light and a reference light, both of which are linearly polarized, by the splitting polarizer; imparting a phase difference to the obtained measurement light and the reference light by the PEM so that they correspond to the spectrometry; inputting the reference light imparted with the phase difference as a feedback signal to the PEM control circuit; and outputting a modulation control quantity signal to the PEM driver; and a step of: configuring a CPU circuit to the spectrometer, the CPU circuit that monitors a wavelength of the light in the splitting polarizer and inputs a wavelength variation thereof as a wavelength signal; converting the wavelength signal to a feedforward signal by the CPU circuit; and outputting the feedforward signal to the PEM control circuit, wherein the PEM control circuit uses the feedback signal and the feedforward signal to output the modulation control quantity signal to the PEM driver.

Effect of the Invention

According to the present invention, the phase difference control device comprises a PEM control circuit to configure a feedback control loop and further comprises a CPU circuit to monitor a wavelength variation of a light incident to a PEM (wavelength variation in a splitting polarizer), so that a feedforward signal is calculated by a fixed condition, and the feedforward signal and a feedforward signal are arithmetically processed by the PEM control circuit to calculate a modulation control quantity signal. By controlling a PEM driver by using this modulation control quantity signal, responsiveness can be improved than before and a stable phase difference control can be achieved even if a wavelength variation of a light incident to the PEM occurs. As a result, since responsiveness of the phase difference control is improved, the phase difference control device and method that can handle not only step-scanning but also continuous-scanning can be achieved.

DESCRIPTION OF REFERENCE SIGNS

Figure 1:
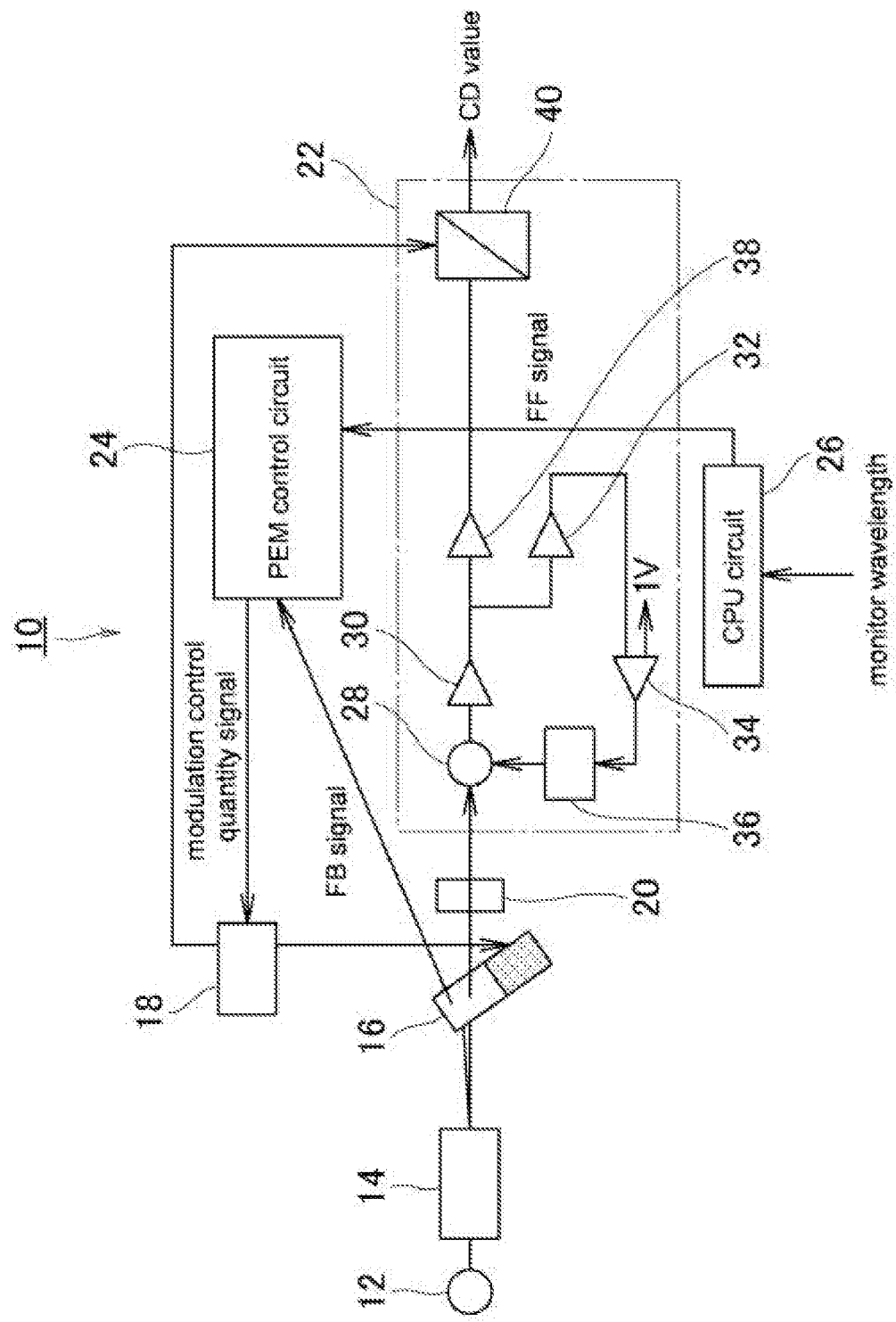
FIG. 1 shows a schematic configuration of a CD spectrometer to which a phase difference control device according to the present invention is applied.

10 CD spectrometer (phase difference control device)
12 Light source
14 Splitting polarizer
16 PEM
18 PEM driver
20 Sample
22 Detection circuit
24 PEM control circuit
26 CPU circuit
28 PMT detector
30 Pre-amplifier
32 DC amplifier
34 Operational amplifier
36 Sensitivity adjusting HT
38 Detecting amplifier
40 Lock-in amplifier
42 Temperature compensating circuit
44 Temperature detector

BEST MODE FOR CARRYING OUT THE INVENTION

Hereinbelow, the phase difference control device of the present invention is described with reference to the figures; however, the present invention is not limited to the examples given below as long as it is included in the scope of the present invention.

FIG. 1 shows a schematic configuration of a circular dichroism spectrometer (CD spectrometer) as a spectrometer according to an embodiment of the present invention. A CD spectrometer 10 in FIG. 1 is configured with a phase difference control device of the present invention. The CD spectrometer 10 shown in FIG. 1 comprises: a light source 12 that emits a light to a sample 20; a splitting polarizer 14 that disperses the light from the light source 12 to a monochromatic light and splits the light incident from the light source into a polarized light (linearly polarized light) of a measurement light and a reference light; a PEM 16 that performs a phase modulating action for imparting a phase difference to the linearly polarized light from the splitting polarizer 14; a PEM driver 18 that supplies a modulation voltage for the PEM 16 to perform the phase modulating action; and a detection circuit 22 that detects the measurement light that transmitted the sample 20. The CD spectrometer 10 of the present embodiment further comprises a PEM control circuit 24 and a CPU circuit 26 for configuring the phase difference control device.

The light from the light source 12 is dispersed into a monochromatic light by the splitting polarizer 14, and the monochromatic light is further split into a linearly polarized measurement light and a linearly polarized reference light. The splitting polarizer 14 in the present embodiment is configured to comprise a monochromator, a Rochon prism, and the like. In the present embodiment, a monochromator for linearly polarizing the light from the light source 12 and a Rochon prism for splitting the linearly polarized light may be configured separately. Both of the lights that are linearly polarized by the splitting polarizer 14 (measurement light and reference light) reach the PEM 16. At this point, a modulation voltage is supplied from the PEM driver 18 to the PEM 16, and when the measurement light and the reference light transmit through the PEM 16, a prescribed phase difference corresponding to various measurements is imparted thereto and the lights become a circularly polarized light that changes in right and left. Among this right- and left-handed polarized light, the measurement light is made incident to a sample 20.

The sample 20 is a measurement target having CD (circular dichroism). When the right- and left-handed circularly polarized lights (measurement light) transmit through the sample 20, they are absorbed at different amounts in right and left and are detected by a detection circuit 22 as the light having an intensity variation depending on CD. Then, a specific processing is performed by various amplifiers at the detection circuit 22 and a CD value is output as a measurement result. Then, for example, an analysis of a spectrum is performed by a spectral analysis device, a personal computer, and the like.

Here, a process of detecting the CD value in the detection circuit 22 is described. The detection circuit 22 is configured with a PMT detector 28, a sensitivity adjusting HT 36, a lock-in amplifier 40, and a plurality of various amplifiers (a preamplifier 30, a DC amplifier 32, an operational amplifier 34, and a detecting amplifier 38). The measurement light that has transmitted the sample 20 is converted to a CD voltage by the PMT detector 28, and a voltage value of the CD voltage is amplified by the preamplifier 30. Since this CD voltage is an extremely weak voltage signal, it is amplified by various amplifiers inside the detection circuit 22.

The CD voltage contains a direct-current component and an alternating-current component, and the direct-current component among the amplified CD voltage is selectively amplified by the DC amplifier 32. Then, via the operational amplifier 34, the amplified CD voltage (direct-current component) is amplified at a proportion of which a difference relative to 1 V, for example, is predetermined, and is input to the sensitivity adjusting HT 36. The sensitivity adjusting HT 36 adjusts the sensitivity of the PMT detector 28 so that the size (voltage) of this direct-current component becomes constant.

The CD voltage stabilized by these processes is input via the detecting amplifier 38 to the lock-in amplifier 40. In the lock-in amplifier 40, a reference voltage is input from the PEM driver 18, and the CD value detected by the lock-in amplifier 40 is spectrally analyzed in accordance with a specific purpose. The CD spectrometer 10 in the present embodiment schematically detects the CD value in a flow as described above.

<Phase Difference Control>

Next, the phase difference control of the PEM 16 in the CD spectrometer 10 according to the embodiment of the present invention is described. The CD spectrometer 10 comprises a PEM control circuit 24 for achieving a stable phase difference control. The PEM control circuit 24 inputs the reference light in the PEM 16 as the feedback signal (FB signal of FIG. 1), and performs an arithmetic processing inside the PEM control circuit 24 by a specific condition to calculate the modulation control quantity signal.

Although it is not shown in FIG. 1, the reference light input to the PEM control circuit 24 is converted to a voltage signal by a photomultiplier tube, for example, and is input to the PEM control circuit 24 as the feedback signal. Then, the PEM control circuit 24 outputs the modulation control quantity signal to the PEM driver1 8, and the PEM driver 18 supplies a modulation voltage in accordance with the modulation control quantity signal to the PEM 16 to configure a feedback control loop.

As described above, the phase difference control of the PEM 16 is performed by using the feedback control loop by the PEM driver 18 and the PEM control circuit 24. Therefore, even if the actual phase modulation quantity relative to the aimed phase modulation quantity is deviated due to the wavelength variation of the light incident to the PEM 16, for example, the modulation voltage corresponding to the deviation of the phase modulation quantity can be supplied from the PEM driver 18 to the PEM 16. As a result, even if a wavelength variation occurs in the light incident to the PEM 16, a stable phase difference control can be achieved by the feedback control loop described above.

In addition to the feedback control loop (PEM 16, PEM driver 18, PEM control circuit 24) described above, the CD spectrometer 10 of the present embodiment further comprises a CPU circuit 26 to configure the phase difference control device. The CPU control circuit 26 comprises a CPU (central processing unit) and the like, for example. The CPU circuit 26 in the present embodiment monitors the wavelength of the light in the splitting polarizer 14 at all times.

That is, the CPU circuit 26 monitors the wavelength of the light in the splitting polarizer 14 (wavelength of the light incident to the PEM 16) at all times, and receives a wavelength variation thereof as a wavelength signal. Then, the wavelength signal input to the CPU circuit 26 is arithmetically processed by a table prepared inside the CPU circuit 26 in advance or a predetermined algorithm to be converted to a feedforward signal, and the feedforward signal (FF signal in FIG. 1) is output to the PEM control circuit 24.

In the PEM control circuit 24, the feedback signal as the reference light in the PEM 16 and the feedforward signal calculated by the wavelength variation of the light incident to the PEM 16 are input. The PEM control circuit 24 arithmetically processes these feedback signal and feedforward signal to calculate the modulation control quantity signal, and outputs the modulation control quantity signal to the PEM driver 18.

<Calculation of the Feedforward Signal>

The feedforward signal is calculated by using a table prepared in advance relative to the wavelength signal (wavelength variation of the light incident to the PEM 16) as described above, or arithmetically processing by an algorithm. For example, the feed forward signal can be calculated by an output command table of which an output command that corresponds to each wavelength is shown inside the CPU circuit 26. In this case, since the feature may be slightly different in each PEM used for spectrometry, different output command tables may be prepared for each PEM.

By calculating a voltage value that is the CD maximum value in advance, the output command table necessary for spectrometry (phase difference control) can be obtained. The voltage value that is the CD maximum value can be calculated by, for example, raising a PEM voltage by designated steps to obtain a CD value data relative to respective PEM voltage, so that a peak position of the data may be set as the CD voltage maximum value and the voltage value may be set as the V maximum value.

Moreover, the feedforward signal can be calculated by a predetermined algorithm prepared in advance inside the CPU circuit 26. For example, the PEM voltage is raised, and when the difference (differential value) of the CD value becomes minus, the PEM voltage is lowered; and when the differential value becomes minus afterwards, the PEM voltage is raised. The convergent point obtained by repeating this is set as the CD maximum value, and the voltage value at that time may be set as the V maximum value.

As another method, the feedforward signal can be calculated by executing a program or the like that comprises an optimization algorithm such as gradient descent or peak detection. Gradient descent as used herein is an algorithm of a gradient method that searches the minimum value of a function only from the gradient (first derivative) of the function, or an algorithm based on a concept similar to this. In the present embodiment, the output command table may be produced by using gradient descent or peak detection. Moreover, the output command table for each PEM can be obtained by calculating the V maximum value obtained by the methods described above in all wavelength region and all wavelength point of the measurement device; however, efficiency of calculating the output command table can be improved by limiting the wavelength for calculating the V maximum value, so that the space can be complemented by a mathematical formula showing the relationship between V-Wavelength shown below.

$$\frac{\lambda}{V_m} = \frac{K\pi dn^3(\lambda)Q(\lambda)}{A\lambda} =$$

$$\frac{K\pi d}{1.841} \cdot \left(\alpha_0 + \frac{\alpha_1}{\lambda^2} + \frac{\alpha_2}{\lambda^4} + \frac{\alpha_3}{\lambda^6} + \ldots\right)$$

[Mathematical formula 1]

λ: Wavelength

Vm: Voltage maximum value

A: Phase difference

Q: Photoelastic coefficient

As the calculation of the feedforward signal, in CD spectrometers, A in the above mathematical formula is set as 1.841 radian; however, in an ellipsometer, for example, A in the above mathematical formula may be set as 2.405 radian, so that the maximum value of the CD value can be calculated. Similarly, in an optical rotary dispersion meter (ORD) or a linear dichroism spectrometer (LD), for example, A in the above mathematical formula may be set as 3.05 radian, so that the maximum value of the CD value can be calculated. The algorithm for calculating the feedforward signal in the CPU circuit 26 of the present embodiment is not limited to the algorithm that employs the above mathematical formula or method, and other algorithm or method can be empolyed as long as the maximum value of the CD value can be calculated.

Specific examples of the algorithm for calculating the CD maximum value in the output command table may include: Gauss-Newton method, Newton method, Pattern Search method, Nelder-Mead method, Genetic Algorithm, Particle Swarm Optimization, Differential Evolution, Cuckoo search, Firefly Algorithm, and the like.

In addition to the feedback control loop, the phase difference control device further comprises the CPU circuit 26, and the phase difference control is performed by using the feedback signal and the feedforward signal, so that a stable phase difference control can be achieved even if a wavelength variation occurs to the light incident to the PEM, and the phase difference control with responsiveness superior than before can be achieved. As a result of improvement in responsiveness, not only step-scanning but also continuous-scanning can be handled, and thus the phase difference control device of the present invention can be used in CD spectrometers and LD spectrometers in which continuous-scan is necessary.

<Modification>

Due to the characteristic of the PEM, it has an extremely high Q value. Therefore, the oscillation frequency greatly varies when a slight change in temperature occurs, and thus the measurement result may be affected greatly. Hence, the phase difference control device in this modification is configured by adding a circuit configuration that can respond to effects of such temperature change.

Figure 2:
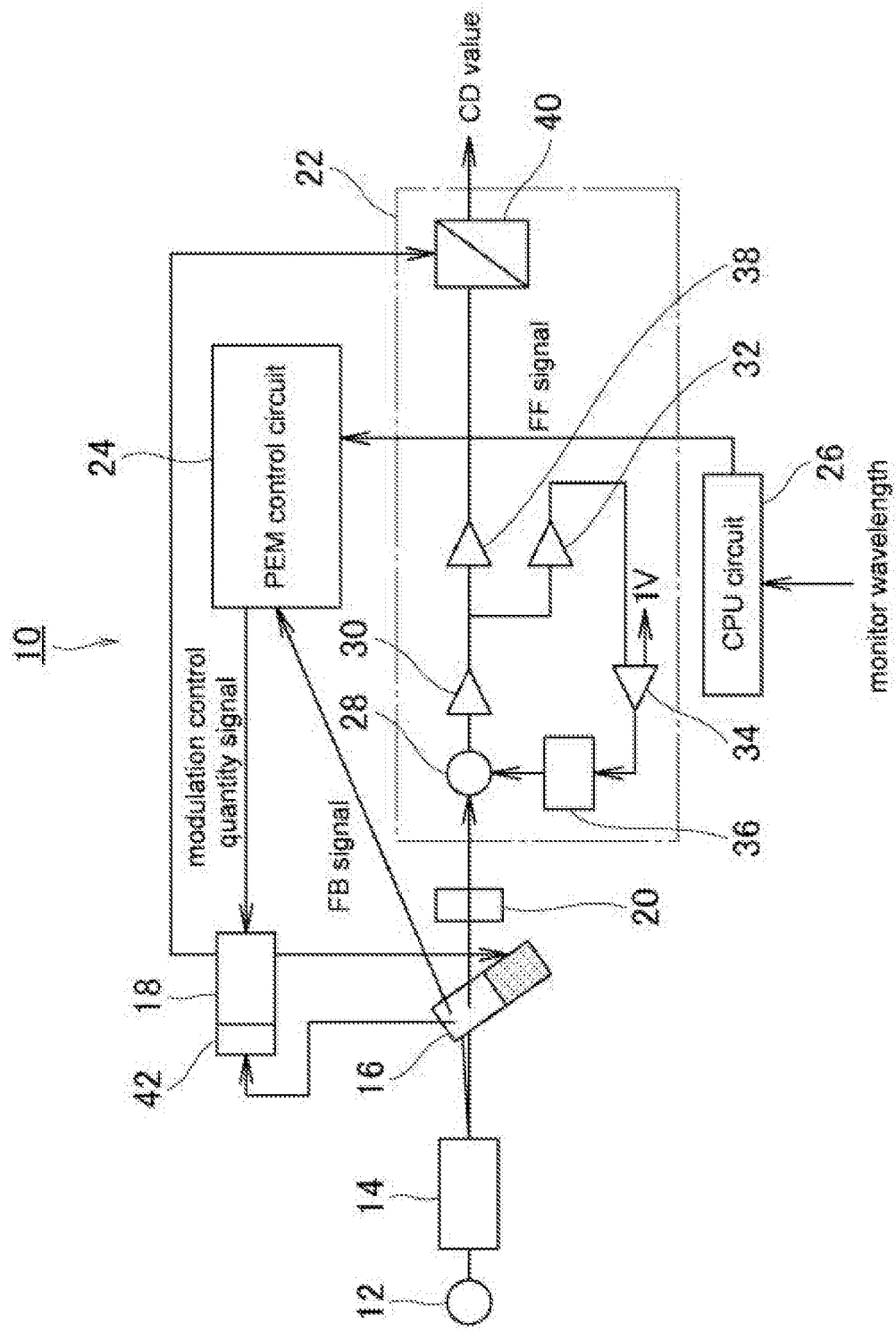
FIG. 2 shows a schematic configuration of a modification in a CD spectrometer to which a phase difference control device according to the present invention is applied.

FIG. 2 shows a schematic configuration of a modification in the CD spectrometer according to the embodiment of the present invention. In FIG. 2, the CD spectrometer 10 is configured with the phase difference control device of the present invention as in FIG. 1. The CD spectrometer 10 in FIG. 2 basically has a same configuration with the CD spectrometer 10 shown in FIG. 1; however, the modification comprises a temperature compensating circuit 42 for further enhancing stability of the phase difference control in the PEM 16.

The temperature compensating circuit 42 is provided integrally with the PEM driver 18, and is integrally configured by being connected to an inner circuit of the PEM driver 18, for example. Moreover, in the temperature compensating circuit 42, a temperature detector 44 such as a thermistor or other thermometers is disposed near the PEM 16 (or disposed to be in contact with the PEM 16), and a temperature detection value (temperature detection signal) from the temperature detector 44 is input to the temperature compensating circuit 42, so that the temperature compensation action in the phase difference control is achieved.

Figure 3:
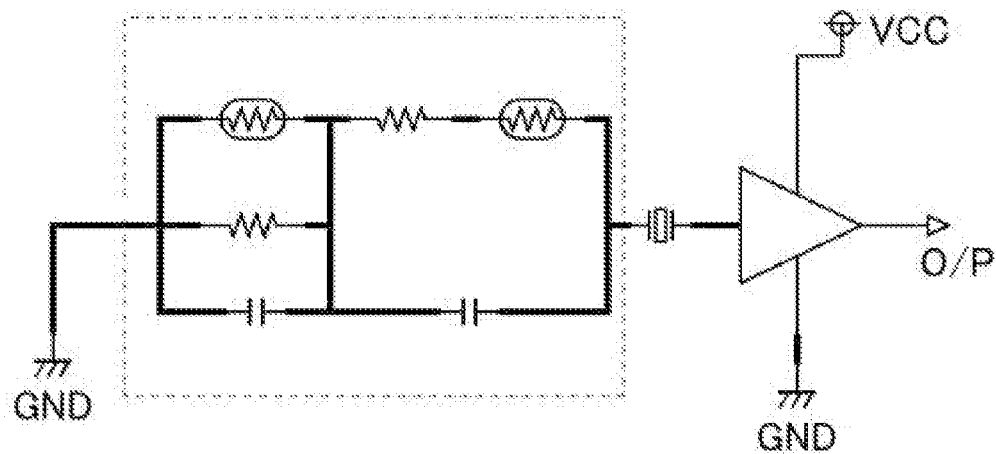
FIG. 3 (a) shows a series-type TCXO circuit that can be employed in a temperature compensating circuit in the present embodiment, and FIG. 3 (b) shows an indirect-type TCXO circuit hat can be employed in a temperature compensating circuit in the present embodiment.
Figure 3:
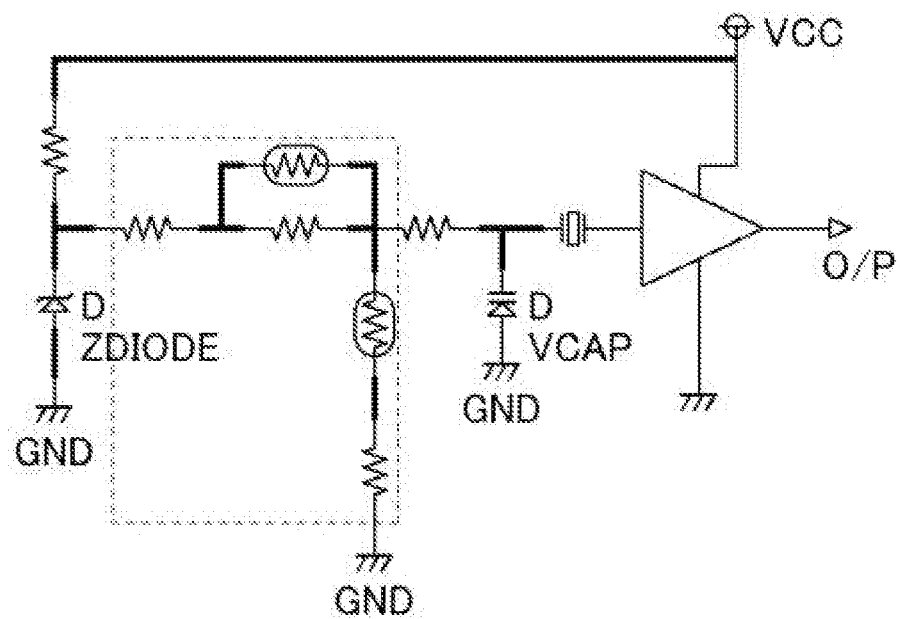

In the temperature compensating circuit 42, for example, a TCXO type circuit such as a series-type TCXO as shown in FIG. 3(a), or a an indirect-type TCXO as shown in FIG. 3(b) (temperature compensating type crystal oscillator) can be employed. Moreover, the temperature compensating circuit 42 in the present modification can employ, not only the TCXO type circuit configuration, but also other circuits so long as the temperature compensation action of the PEM 16 can be achieved.

During the phase difference control, an ambient temperature of the PEM 16 (or the temperature of the PEM 16 itself) detected by the temperature detector 44 is input as the temperature detection signal to the temperature compensating circuit 42. When the temperature detection signal is input, a resistance value of the temperature compensating circuit 42 varies in accordance with the detected value, so that the PEM driver 18 can supply a suitable modulation voltage in accordance with the temperature change of the PEM 16.

That is, in the present modification, the phase difference control of the PEM 16 is performed by using the feedback signal and the feedforward signal by the PEM control circuit 24, and, at the same time, the temperature of the PEM 16 is detected to perform control by the temperature compensating circuit 42. Therefore, a stable phase difference control of which responsiveness is superior than before and effect of the temperature change in (and around) the PEM is suppressed can be achieved.

According to the present invention, the phase difference control method capable of a stable phase difference control of which responsiveness is superior than before and effect of the wavelength variation of the light incident to the PEM 16 is smaller can be achieved by: performing steps of configuring the feedback control loop by inputting the feedback signal from the PEM 16 and outputting the modulation control quantity signal to the PEM driver 18 by the PEM control circuit 24, as described above; and outputting the feedforward signal based on the wavelength variation of the light in the splitting polarizer 14 monitored by the CPU circuit 26; and performing a prescribed arithmetic processing with the feedback signal and the feedforward signal by the PEM control circuit 24 to output the modulation control quantity signal to the PEM driver 18.

Furthermore, in the above-described embodiment and modification, cases where the phase difference control device and the phase difference control method according to the present invention are employed in CD spectrometers have been described; however, similar effect can be achieved when they are employed in other spectrometers such as ellipsometers, optical rotary dispersion meters (ORD), and linear dichroism spectrometers (LD).

What is claimed is:

1. A phase difference control device employed in a spectrometer that performs spectrometry to a sample, the phase difference control device comprising:

a splitting polarizer that splits a light incident from a light source into a measurement light and a reference light, both of which are linearly polarized;

a photoelastic modulator (PEM) that performs a phase modulating action to impart a phase difference to both of the measurement light and the reference light;

a PEM control circuit that inputs a voltage signal that is converted from the reference light imparted with the phase difference as a feedback signal and outputs a modulation control quantity signal; and a PEM driver that inputs the modulation control quantity signal and supplies a modulation voltage in accordance with the modulation control quantity signal to the PEM for making the PEM to perform the phase modulating action;

wherein the phase difference control device further comprises a central processing unit (CPU) circuit that monitors a wavelength of the light in the splitting polarizer and inputs a wavelength variation thereof as a wavelength signal;

the CPU circuit converts the wavelength signal to a feedforward signal, and the feedforward signal is output to the PEM control circuit;

the PEM control circuit performs arithmetic processing by the feedback signal and the feedforward signal to output the modulation control quantity signal to the PEM driver; and the CPU circuit calculates the feedforward signal by obtaining a convergent point of circular dichroism (CD) values by raising and lowering a PEM voltage, setting the convergent point as a CD maximum value, and setting a value of the PEM voltage at the time of obtaining the CD maximum value as a voltage maximum value of the modulation voltage.

2. The phase difference control device according to claim 1 comprising:

a temperature compensating circuit for supplying the modulation voltage from the PEM driver to the PEM, the modulation voltage being a voltage to make the phase difference imparted to the measurement light and the reference light constant even if the temperature of the PEM changes, wherein the temperature compensating circuit inputs a detection value detected by a temperature detector for detecting the temperature of the PEM to perform a temperature compensating action.

3. The phase difference control device according to claim 2, wherein the PEM driver is configured to comprise the temperature compensating circuit to at least a part thereof, and the temperature compensating circuit is configured to comprise a temperature compensating type crystal oscillator.

4. A phase difference control method to control a phase difference of a photoelastic modulator (PEM) in a spectrometer that comprises at least a light source, a splitting polarizer, a PEM, a PEM driver, and a PEM control circuit, the method comprising:

a step of configuring a feedback control loop by: splitting a light incident from the light source into a measurement light and a reference light, both of which are linearly polarized, by the splitting polarizer; performing a phase modulating action to impart a phase difference to both of the obtained measurement light and the reference light by the PEM; converting the reference light imparted with the phase difference to a voltage signal; inputting the voltage signal as a feedback signal to the PEM control circuit; outputting a modulation control quantity signal from the PEM control circuit to the PEM driver; and supplying a modulation voltage in accordance with the modulation control quantity signal from the PEM driver to the PEM for making the PEM to perform the phase modulating action; and a step of: configuring a central processing unit (CPU) CPU circuit to the spectrometer, the CPU circuit that monitors a wavelength of the light in the splitting polarizer and inputs a wavelength variation thereof as a wavelength signal; converting the wavelength signal to a feedforward signal by the CPU circuit; and outputting the feedforward signal to the PEM control circuit, wherein the PEM control circuit uses the feedback signal and the feedforward signal to output the modulation control quantity signal to the PEM driver, and the CPU circuit calculates the feedforward signal by obtaining a convergent point of circular dichroism (CD) values by raising and lowering a PEM voltage, setting the convergent point as a CD maximum value, and setting a voltage value of the PEM voltage at the time of obtaining the CD maximum value as a voltage maximum value of the modulation voltage.

* * * * *